US011282054B2

(12) United States Patent
Höflich et al.

(10) Patent No.: US 11,282,054 B2
(45) Date of Patent: Mar. 22, 2022

(54) METHOD FOR SERVICE RECORDING IN CONNECTION WITH MOBILE SERVICES

(71) Applicant: VOLKSWAGEN AKTIENGESELLSCHAFT, Wolfsburg (DE)

(72) Inventors: Sebastian Höflich, Lübeck (DE); Volker Römmeler, Lauingen am Elm (DE); Jan Wehinger, Braunschweig (DE)

(73) Assignee: Volkswagen Aktiengesellschaft ( * ) Notice: Subject to any disclaimer, the term of this patent is extended or adjusted under 35 U.S.C. 154(b) by 0 days.

(21) Appl. No.: 16/758,503

(22) PCT Filed: Aug. 28, 2018

(86) PCT No.: PCT/EP2018/073153
§ 371 (c)(1),
(2) Date: Apr. 23, 2020

(87) PCT Pub. No.: WO2019/081097
PCT Pub. Date: May 2, 2019

(65) Prior Publication Data
US 2020/0258064 A1   Aug. 13, 2020

(30) Foreign Application Priority Data

Oct. 27, 2017   (DE) .................... 10 2017 219 349.2

(51) Int. Cl.
G06Q 20/00 (2012.01)
G06Q 20/14 (2012.01)
G06Q 50/30 (2012.01)

(52) U.S. Cl.
CPC .......... *G06Q 20/145* (2013.01); *G06Q 50/30* (2013.01)

(58) Field of Classification Search
CPC .................................................... G06Q 20/145
(Continued)

(56) References Cited

U.S. PATENT DOCUMENTS

2004/0049424 A1*  3/2004  Murray ............. G06Q 30/0226
                                                            705/14.14
2005/0128304 A1*  6/2005  Manasseh ............... G07C 9/00
                                                            348/207.99
(Continued)

FOREIGN PATENT DOCUMENTS

DE     102012206770 A1    11/2013
DE     202015106556 U1     1/2016

OTHER PUBLICATIONS

Insights in costing of continuous broadband internet on trains to allow delivering value via services. International Conference on ITS Telecommunications p. 407-412. Bram Naudts, Jan Van Ooteghem, Sofie Verbrugge, Didier Colle, Mario Pickavet (Year: 2013).*

(Continued)

*Primary Examiner* — Bruce I Ebersman
*Assistant Examiner* — John A Anderson
(74) *Attorney, Agent, or Firm* — Barnes & Thornburg LLP

(57) ABSTRACT

A method for recording services provided in a mobile service vehicle composed temporarily of a vehicle carriage and a service-specific passenger compartment wherein services are provided by a service provider during the journey. The method includes linking the service provider to the passenger compartment via information technology, determining a service provided during the journey using the passenger compartment, automatically allocating a first service dataset, which corresponds to the service that has been provided, to a service provider's account using the link.

7 Claims, 4 Drawing Sheets

(58) Field of Classification Search
USPC .......................................................... 705/40
See application file for complete search history.

(56) References Cited

U.S. PATENT DOCUMENTS

| | | | |
|---|---|---|---|
| 2009/0030885 A1* | 1/2009 | DePasquale | G07C 5/008 |
| 2015/0220916 A1* | 8/2015 | Prakash | G06Q 20/40 |
| | | | 705/41 |

OTHER PUBLICATIONS

Luxury Mobile Barbershop; downloaded prior to Oct. 27, 2017; downloaded from https://www.luxurymobilebarershop.com/.
Search Report for International Patent Application No. PCT/EP2018/073153; dated Oct. 2, 2018.
Abenteuer & Allrad 2016: Pickup-Kabine vom Schreiner; Explorer Magazine; Apr. 1, 2016; downloaded from https://explorer-magazin.com/technik/pickup-kabine-vom-schreiner/ and Google® translation.

* cited by examiner

METHOD FOR SERVICE RECORDING IN CONNECTION WITH MOBILE SERVICES

PRIORITY CLAIM

This patent application is a U.S. National Phase of International Patent Application No. PCT/EP2018/073153, filed 28 Aug. 2018, which claims priority to German Patent Application No. 10 2017 219 349.2, filed 27 Oct. 2017, the disclosures of which are incorporated herein by reference in their entireties.

SUMMARY

Illustrative embodiments relate to a method for recording payments which are determined in connection with services provided during the journey. In particular, illustrative embodiments relate to possible ways of reducing a number of required signaling operations when recording payments made in connection with mobile services and added value.

BRIEF DESCRIPTION OF THE DRAWINGS

Exemplary embodiments are described in detail below with reference to the attached drawings, in which.

DETAILED DESCRIPTION

Figure 1:
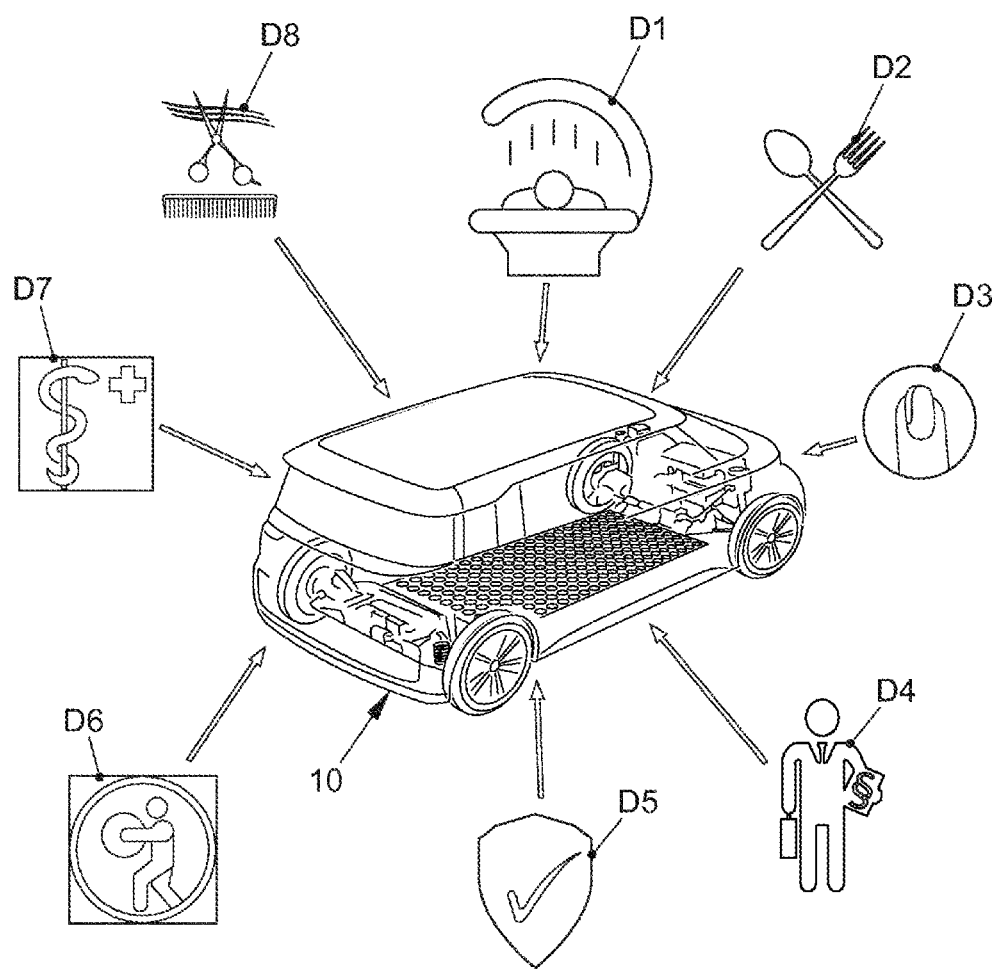
FIG. 1 shows a basic diagram illustrating exemplary embodiments which can be used within the scope of the present disclosure for CABs in conjunction with a vehicle carrier to achieve a mobile service vehicle for implementing the disclosed embodiments.

Private transportation is currently making rapid advances. On the one hand, jointly used transportation vehicles (car sharing, pool vehicles, etc.) are increasingly in demand and are being offered in an ever more professional way. On the other hand, the automation of private passenger transportation is also advancing at an increasing pace, permitting the occupants of corresponding transportation vehicles to make use of the travel time in other ways.

In contrast, up until now services have usually been offered in stationary facilities (e.g., "retail stores"). Providers of stationary services have hitherto been faced with the problems that they can only achieve high turnover rates in expensive prime locations, that scaling is difficult, that rental contracts tie them to one location in the long term and that the investment costs and the business risk are high.

End customers wishing to experience the service sometimes have to travel long distances and accept high costs for the stationary services. Consequently, the end customer spends not only the traveling time to his place of work but additionally the time to the respective service provider (e.g., restaurant, lawyer, public authority) in his transportation vehicle. At present, a German person spends approximately 60 minutes per day in his transportation vehicle. In addition, many older persons can no longer drive. Autonomous driving makes this possible again.

Depending on the sector, approaches are also known in which the service comes to the customer. For example, hairdressing services are offered at home or traveling retail traders (the "egg man") stop by in residential areas to sell goods there.

The provision of services to passengers is already known in isolated cases. For example, gastronomic services can be used in long-distance trains or audiovisual contents ("onboard cinema") can be consumed.

DE 20 2015 106 556 U1 discloses a mobile apparatus for the mobile provision of different services of a modular design, comprising a drive unit, an energy storage unit and/or associated electronics. A replaceable service module, which can comprise, for example, a faucet module, a cooling module, an ice module or a wet section, is connected to a chassis in a reversible manner by corresponding locking points.

UBER has in the meantime been using bicycle couriers to deliver food directly to a transportation vehicle. It is therefore possible for at least the results of gastronomic services to be enjoyed in conventional transportation vehicles at minimum additional cost. On the other hand, the transportation vehicles themselves are not embodied in a service-specific manner. In addition, the service is not provided in the transportation vehicle but rather ends at the transportation vehicle door with the handing over of the food.

Www.luxurymobilebarbershop.com offers a mobile hairdressing salon in which the customer defines the location of the service (for example, airport car park), and the driver drives the mobile hairdressing salon to the defined destination to provide the service there.

Services which are offered in transportation vehicles already offer on-demand services nowadays, particularly in the luxury segment. These services provide their end customers with geographical independence, a saving in time and exclusivity, but usually at a price which is too high for large customer groupings. Services which are offered in transportation vehicles can nowadays usually be found in the luxury segment owing to high investment costs and lack of capacity. The reasons for this are that the transportation vehicle has to be bought for conversion, the conversion requires a large amount of manual work, few standard components are available, the service provider has to travel long distances between the customers, and finally the operative management (payment, booking, taxes) has to be dealt with independently by the service provider. In addition, extensive modifications of transportation vehicle are always associated with costly individual acceptance procedures at the relevant authorities.

Taking the above-mentioned prior art as a starting point, disclosed embodiments provide a suitable possible way of recording and reporting mobile services. In particular, disclosed embodiments keep the signaling effort low in this context.

Illustrative embodiments are based on the fundamental idea that the consumption willingness of passengers is fundamentally higher than if the same person must spend freely available time on the consumption of a service.

To better adapt the consumption of services during transportation to the requirements of the service provider and the customer, the disclosed embodiments are based, for example, on the concept of providing transportation vehicle platforms having all technical units needed for autonomous driving, such as chassis, drive unit etc., which can be connected, if necessary, to passenger compartments tailored to the provision of a service during the journey. The passenger compartments are referred to as "CABs" within the scope of the present disclosure. "CAB" stands for "cabin".

In other words, a CAB is a transportation vehicle superstructure which is adapted for a specific service or a group of services and contains all interfaces to accommodate and operate the device needed to provide the service.

The CAB can therefore be understood as meaning a mechanical unit which can be connected as such to the transportation vehicle platform/the vehicle carrier via predefined interfaces. The interfaces ensure a mechanically reversible, but reliable connection between the CAB and the vehicle carrier. Further interfaces can be configured to transmit energy, in particular, electrical energy, between the CAB and the vehicle carrier. These interfaces are also reversible. Further operating resources (fluids), mechanical energy transmission methods or mechanisms, for example, shafts, gearwheels or the like, for mechanically transmitting energy from the vehicle carrier to the CAB, as well as radio connections and/or a data connection between the individual CAB and the vehicle carrier as well as their modules may be provided. For all IT connections of the vehicle carrier to the CAB, electrical and/or optical lines, in particular, bus systems, are appropriate as interfaces, for example.

To make it possible to configure a mobile unit (also "mobile service vehicle") composed of a vehicle carrier and a CAB in a cost-effective and rapid manner and with little susceptibility to faults, provision can be made for all the interfaces between the CAB and the vehicle carrier to be arranged in an essentially identical direction corresponding to one another. In other words, a CAB can be engaged mechanically with the vehicle carrier in a first direction, in which case rails, for example, ensure a form-fitting connection between the CAB and the vehicle carrier. The same direction can be provided for the energy connection between the vehicle carrier and the CAB. It can be ensured that a correct mechanical connection between the vehicle carrier and the CAB automatically results in a correct energy connection of the vehicle carrier to the CAB. The same can apply to the interfaces for transmitting operating resources. Insofar as data are also to be interchanged between the CAB and the vehicle carrier (e.g., bidirectionally), it is possible, for example, to arrange, correspondingly, circuit-switching interfaces and to close them automatically when the connection is formed between the vehicle carrier and the CAB. However, this does not rule out a wireless transmission of data between the vehicle carrier and the CAB, for which purpose interfaces can likewise be provided. A plurality of interfaces, in particular, standardized interfaces which are essentially the same, can at least be spatially combined and can be arranged in a reversible manner, but protected from undesired release, at corresponding positions on the vehicle carrier/the CAB.

By virtue of the above-mentioned standardization, boundary conditions which are necessary for providing services during the journey can be provided, which conditions enable a considerable reduction in costs and a hitherto unrivaled degree of individualization of transportation vehicles. While the CABs provide the service providers with predefined frameworks, to offer their service in a reliable and suitable way for the users, the vehicle carrier ensures efficient, comfortable, rapid and time-saving transportation, in particular, in the case of vehicle carriers which are capable of automatic driving. As a result, an individual service is offered to persons who are elderly or unfit to drive as well as children during the journey.

The above-mentioned concept composed of a vehicle carrier and a CAB makes it possible to provide individualized services while traveling, in which case the described concept constitutes the physical platform which is made available to potential customers in conjunction with a digital intermediary platform (server). The technology which is disclosed here describes the interaction between the individual components and players in the platform ecosystem. It allows the free time which comes about as a result of the autonomous driving or taxi journeys to be used and monetarized in an optimum way.

Problems of various players are solved in the platform ecosystem. In this context, it is necessary to differentiate between end customers (use services during the journey), service providers (provide services during the journey, such as, e.g., lawyers) and microservice providers (provide modules for equipping the transportation vehicles). The modules do not have to be physical or to relate to the concrete internal equipment of the CAB but instead could also be software modules, e.g., a presentation of a restaurant menu on a display.

The provision of mobile service vehicles composed of the vehicle carrier and CAB can be effected, for example, by a server in conjunction with (mobile) wireless communication terminals ("user terminal") used by the customer/service provider. An application constitutes the interface to the end customer here. The end customer books the mobile on-demand services via the application. To do this, the end user defines the starting point, destination, starting time and type of service to be provided during the journey. End customers can carry out other tasks via the application, for example, can send requests, view search results, book mobile service vehicles/services, give ratings and pay for the booked or acquired services.

The service provider can digitally keep available its own profile, by which the end user can be informed of the services offered, customer opinions etc. If the end user decides to obtain a service, his request is displayed on the user terminal belonging to the mobile service provider or in the transportation vehicle thereof. The service provider can accept the request, thus resulting in the combined transportation/service agreement.

Services which can be provided within the scope of the present disclosure can, for example, be divided up into the following forms/categories:

the service can be provided by a person or in an unmanned state (e.g., a hairdresser as opposed to a multimedia presentation), and individualized CAB or mass-produced goods (e.g., generic restaurant as opposed to a system-gastronomy business).

In summary, the transportation vehicle architecture on which the present technology is based comprises at least two concrete components: the component which is necessary for transportation is referred to as a "vehicle carrier" in which the technology for autonomous driving can be located. In addition, the transportation vehicle superstructure (CAB) is used which contains all the interfaces for accommodating and operating the specific device which is needed to provide the service. The transportation vehicles which are composed of the above-mentioned components are also referred to as a "mobile service vehicle". They could also be referred to as "physical apps on wheels", since they are as versatile in terms of their range of functions as smartphone platforms which are individualized by applications.

On the basis of the technology disclosed above, the purpose mentioned above is achieved by a method for recording payments with respect to services provided during the journey. The service provided in a mobile manner can be provided in an above-described cabin/CAB of a mobile service vehicle. Depending on how many payments need to be compared with one another in connection with the mobile service vehicle or the service on the basis of a scope of the service, the information flows for a comparison or for mutually remunerating the use of hardware and the obtaining of the service and usage rights may be very extensive. Whereas only the customer has to provide a hairdresser with a predetermined amount of money for the service received in a shop for example, a multiplicity of payments may need to be invoiced and compared with one another when providing a hairdressing/barber service in a mobile service vehicle as a result of different dependencies which are explained by way of example further below. According to at least one disclosed embodiment, to simplify the process of recording payments, a service provider wishing to provide a service during the journey in the CAB is linked to the CAB using IT. This can be carried out, for example, when the service provider starts to rent/configure the CAB. Alternatively or additionally, the IT link can be carried out once a day, once at the beginning of every shift, at the beginning of a service provided during the journey or the like. A service provided by the CAB during the journey is then determined. For example, the service provider can provide a hairdressing service. The service can be determined, for example, using sensors and/or by inputting a predefined signal. In this case, the nature of the service can be documented and/or categorized. A duration and/or goods used while providing the service can also be documented. The goods may be, for example, operating resources and/or tools which influence the value of the service, for example. Finally, a first service record (for example, a data record) corresponding to the provided service is automatically assigned to an account of the service provider on the basis of the above-mentioned link. The service record can indicate, in particular, quantitatively characterize, the value of the service and/or an equivalent value. The service record can generally document the receipt of added value. In other words, it is determined that the service has been provided in the CAB used and the first payment record has been credited to the service provider on the basis of the IT link between the CAB and the service provider. In the simplest case, the service provider may be the service provider providing the service inside the CAB. In other words, a worker or a service person or the like inside the CAB can work "for their own account". However, the service provider can also be understood as meaning an employer employing a multiplicity of persons in CABs assigned thereto to provide mobile services. The service provider can therefore also be an employer, while the persons inside the CABs can be understood as meaning "performing service providers". The payment record may be, for example, a data record which quantifies or quantitatively documents the payment. In this manner, the services provided in connection with the mobile service vehicle used according to the disclosed embodiments and fees can be compared and offset against one another. It is also possible to combine a plurality of payment records with one another before signaling or automatic assignment to the account of the service provider is carried out. This makes it possible to achieve the effort for signaling when documenting the provision of services. The payment record may define an amount of money or the like, but the payment record does not need to have a conventional currency as a unit. Rather, the payments of a multiplicity of CABs, vehicle carriers, service providers and consumers/customers of the services are related to one another (for example, offset against one another) in the ecosystem on which the disclosure is based before an amount in an official currency is conventionally transferred to a bank account of one of the involved parties. The signaling to banks/financial institutions can be kept low in this manner. The transit times/processing times can be considerably reduced. Moreover, the risk of a (misdirected) amount of money arriving at the addressee with a considerable delay or not at all can be reduced or entirely avoided by the system-inherent handling and offsetting (before the IT transmission). As a result, the time and costs needed to offset payments in connection with services provided in a mobile manner become more convenient and cost-effective.

Since the consumer of a service according to the disclosure also receives a driving service/mobility service during the consumption of the service, for which costs incurred by the driving service provider need to be paid, the consumer must document the receipt of added value not only for the service provider but possibly also for the mobility service provider. For example, the consumer can acknowledge a payment record in this case or can credit a payment record for compensating for the received service. Expressed in simple terms, the consumer also has to "pay" (at least proportionally) for the driving service. The consumer of the service/the passenger is therefore optionally linked to the vehicle carrier assigned to the mobile service vehicle used using IT. An assignment between the consumer and the vehicle carrier is carried out at least for the current or immediately imminent journey. The driving service/rental provided by the vehicle carrier is determined by the end of the journey with the mobile service vehicle or by the end of the service obtained during the journey (depending on which lasts longer). In this case, the driving service is substantially independent of the service obtained during the journey. The driving service can be determined in the manner of a taximeter. In other words, the energy and/or time used to cover the booked route can be determined. At least part of the determined driving service is then written in a corresponding payment record and the payment record is automatically assigned to the consumer's account. This payment record could also be understood as meaning the "fare". The automatic assignment is carried out on the basis of the link between the passenger and the vehicle carrier on which the covered journey is based. This does not exclude the fact that the vehicle carrier is effected via an IT link to the CAB used and an IT link of the CAB to the consumer.

If the service provider experiences comparatively low utilization for example, the service provider can motivate customers to obtain the service offered thereby in different ways. For example, the service provider can provide his service at a discounted rate or for free on a trial basis. Alternatively or additionally, the service provider can proportionally share the driving costs or can completely assume the driving costs. For this purpose, the service provider can be optionally linked to the vehicle carrier using IT, the driving service provided by the vehicle carrier during the journey can be determined (for example, automatically) and a payment record corresponding to the driving service can be at least proportionally automatically assigned to an account of the service provider. In other words, the service provider can share the remuneration of the driving payment record with a predefined percentage/partial amount. This is also effected, for example, on the basis of the IT link between the service provider and the vehicle carrier. If the above-mentioned share of the service provider in the journey costs were effected in a conventional manner, the consumer would have to pay the service provider for the service, would have to pay some of the journey costs to the operator of the vehicle carrier, and the service provider would have to in turn pay the remaining portion of the journey costs to the operator of the vehicle carrier. This shows the potential for reducing the signaling effort when invoicing the different payments, at least if the payments made are recorded/documented by appropriate signaling operations.

It is therefore also proposed to add those services which are obtained by a consumer over the course of a predefined period (for example, within a month) and to carry out offsetting/signaling only after the predefined period/order volume has elapsed.

Alternatively or additionally, services provided to the consumer by the service provider and driving payment records provided by the operator of the vehicle carrier as a driving service can be offset with a payment record provided by the operator on account of the provision of the CAB. For example, the operator of the CAB can invoice the service provider for the provision of the CAB. In other words, the following can be offset: the payment record which needs to be sent to the service provider by the consumer on account of the received service, the payment record which needs to be sent to the operator by the consumer on account of the driving service and the payment record which needs to be provided to the operator of the CAB by the service provider on account of the provision of the CAB. As a result of the offsetting in a manner according to the disclosure, the signaling of the three payment records can be reduced to a first payment record to be provided to the operator by the consumer and a payment record (service turnover minus operator fees) to be paid to the service provider by the operator. The offset sum can be understood as meaning a further payment record which is assigned to the service provider. In other words, the operator can forward the payment record (or the invoice or the invoice amount), which needs to be paid by the service recipient, minus a commission for providing the CAB and minus the amounts representing the driving service, to the service provider. If only the offset sum is sent to a bank account or a credit account of another financial institution, a smaller amount of money remains passive for the duration of the processing time. In addition, transfer fees are saved since a maximum of two transfers (for example, to financial institutions/banks) are required instead of three.

The operator of the vehicle carrier, for example, can offset and assign the payment records. For example, the operator can provide a virtual currency (similar or identical to the "bitcoin") for the payment exchanged in the ecosystem of the disclosed embodiments, which virtual currency is in a predefined relationship to at least one national currency. This makes it possible to guarantee financial flows in a cost-effective manner and with short processing times. Moreover, the operator can act as a trustee and can protect the participants from attempted fraud. This operator cannot only provide the vehicle carrier but can also assist with the provision of the CAB. In other words, both the CAB or its basic framework and the vehicle carrier can be provided by the same operator of the disclosed ecosystem. The provision of the hardware and organizational framework of obtaining mobile services create mutual trust both in the service provider and in the (potential) customers.

If the service provider acts as a service company or as a service provider operating a plurality of CABs, a plurality of CABs can be linked to the service provider to be able to easily assign the turnover generated by the CABs to the account of the service provider or to the service provider. In this manner, a plurality of CABs belonging to the service provider can provide respective services at the same time and can generate respective first payment records in a manner according to the disclosure which are assigned to the service provider on the basis of the IT link.

The services provided by the CAB can be determined, for example, automatically by a camera, by a contact switch, by a current sensor in conjunction with a reference predefined using data technology. For example, a particular tool or a particular treatment operation can be captured using sensors inside a camera and can be recognized by corresponding patterns in a data memory. Optionally, confirmation of the recognized service by a person present, in particular, by the service provider, may be provided. Alternatively or additionally, the service provider himself can make a user input which is used to document or determine the provided service using data technology. The service can then be assigned, in a manner according to the disclosure, to the service provider or to the CAB linked to the latter using IT.

Depending on the configuration of the ecosystem, provision may be made for originators/manufacturers or other persons involved in the provision of the CAB or economic entities to also have a share in the turnover generated by the CAB during the journey. For example, a designer whose work is intended to promote the sales of a CAB can have a share in the service turnover actually generated during the journey. Accordingly, the CAB designer receives a commission or a share in the service turnover, which could also be referred to as an "originator payment record" on account of the service provided during the journey. The originator payment record can then be offset with the first payment record, that is to say the amount to be paid to the service provider by the consumer for providing the service. In other words, the operator of the vehicle carrier and/or of the CAB can also proportionally pay the payment record paid by the consumer of the service to the manufacturer/originator (of a part) of the CAB. If the margin attributable to the originator payment is determined (for example, dynamically) by the operator, an originator payment record determined for the designer can be conveniently collected in the background and without operations necessary for the consumer or the service provider.

The disclosed method provides a further benefit if the roles of an involved party are reversed (for example, service provider ↔ consumer). If, for example, a performing service provider has been paid for his activity on a first day, his payment can be used on another day to pay for a service according to the disclosed embodiments which has been provided during a journey with a mobile service vehicle without having to make a transfer to a financial institution or a bank in the meantime. Bank fees and bank delay times are reduced, as a result of which the availability of the financial position is improved. Moreover, the signaling effort for recording payments and the probability of a so-called "misdirected document" are again reduced.

A further possible way of making the investments for providing the mobile service vehicles dependent on success involves proportionally offsetting the income from the service with procurement costs for the inventory of the CAB or the tools belonging to the service provider. In this case, the first payment record which needs to be provided to the service provider by the consumer can be offset, for example, with a procurement fee for an item of equipment of the CAB. This makes it possible to provide an incentive for developing items of equipment of mobile service vehicles according to the disclosed embodiments which particularly promote sales.

The disclosed embodiments therefore makes it possible to invoice services provided in mobile service vehicles in a novel manner. For this purpose, the operator of a CAB is linked to the latter, a service provided by the CAB is determined and, in response to this, an amount is transferred from the account of the end customer to the account of the service provider in accordance with the determined payment record for the service provided.

If conventional transfer operations for the transactions are taken as a basis, dispensing with the disclosed system would have the following drawbacks:

if each individual transaction were individually invoiced and processed via a payment provider, costs of an amount of approximately 31.7 ct (source: Stripe.com) would arise, inter alia, for each transaction;

without a corresponding system, it would be considerably more difficult for the operator to achieve his margins based on a share in turnover;

a considerably higher outlay for the operative management of a mobile service vehicle corresponding to the underlying technology would generally be expected.

The service providers can also use offset accounts proposed according to the disclosed embodiments to directly pay their service employees (operative service providers). Tasks such as registering the employee, paying the social security contributions etc. can be performed by the operator in a fully automated manner. This could help a service provider, for example, to concentrate fully on his service and his customers. Payment records/fees can also be raised by the operator for corresponding assistance which can be offered, for example, by an application on a smartphone, a tablet or the like.

FIG. 1 shows a schematic illustration of a vehicle carrier 10 of a mobile service vehicle according to at least one exemplary embodiment of the technology disclosed here. The vehicle carrier in this case provides all features which are required for transportation, in particular, automatic transportation. The chassis, the drive train, the energy store, longitudinal/lateral control logic and devices, exterior lighting, etc. are mentioned merely by way of example. Within the scope of the technology disclosed in the present case, CABs (not illustrated) are used to specifically configure the vehicle carrier to provide a respective service D1 to D8. For example, an irradiation and/or tanning device D1, such as a CAB, can be connected to the vehicle carrier 10 to be able to offer the "tanning" service. For example, a UV irradiation unit and/or a tanning shower may be included. To be able to provide gastronomic services D2, a restaurant CAB may be connected to the vehicle carrier 10. The preparation of food and the consumption of the latter can be enabled by the configuration of the CAB. A cosmetic or nail care service D3 may require, for example, the CAB to have special workbenches, an extraction system for rapidly exchanging the interior air and particularly bright illumination devices (so-called spotlights). To provide legal advisory services D4, a library and/or at least two seating areas may be provided in an accordingly configured CAB. The same applies to an insurance advisory service or financial advisory service D5. Video conferencing hardware and a large screen for displaying graphics and other presentation contents may be provided in this case. Rehab services D6 and medical services D7 can also be supported in the best possible manner by the configuration of a respective CAB. For example, examination and/or training devices may be parts of corresponding CABs. To be able to provide hairdressing services D8, a sink, as is conventional in hairdressing salons for washing hair, a 230-V plug for operating a hairdryer, a large mirror and a height-adjustable hairdressing chair can be provided, for example. The above-mentioned CABs can be connected to the vehicle carrier 10 in a mechanically fixed and crash-proof manner via reversible mechanical interfaces. To ensure energy and information flows between the vehicle carrier 10 and the CAB, reversible interfaces illustrated in detail in conjunction with FIG. 3 are proposed.

Figure 2:
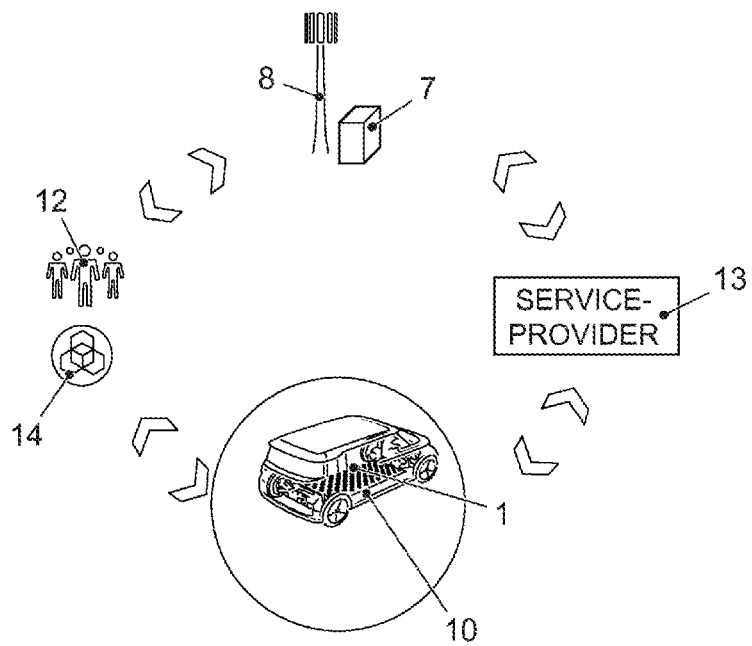
FIG. 2 shows a schematic illustration of a platform ecosystem for illustrating information flows when implementing the disclosed embodiments.

FIG. 2 shows a schematic illustration of a platform ecosystem for illustrating information flows when implementing the technology disclosed in the present case. A microservice provider 14 individualizes the CABs 1 of the mobile service vehicles, which are then connected to a respective vehicle carrier 10 (temporarily or permanently) and are provided. The provision of the mobile service vehicles is carried out by a service provider 13 which determines the need of the users 12 via a server 7 and, for example, a radio tower 8 of a wireless communication network and compares it with the fundamentally available/offered mobile service vehicles. The best possible combinations of offered mobile service vehicle and interested user 12 result in the conclusion of an individual contract regarding the provision of a mobility service and a CAB-specific service. The microservice provider 14 can also provide the individual service or a service package with respect to the end customer and can monitor and ensure the operation of the mobile service vehicle or the CAB for this purpose or can even provide a manual service in a manned mobile service vehicle on board the mobile service vehicle. It goes without saying that the service provider 14 need not be identical to the manufacturer/outfitter of the CAB 1. In this respect, different constellations with respect to the design, the creation and the use of the CABs arise when providing the service with respect to the end customer.

Figure 3:
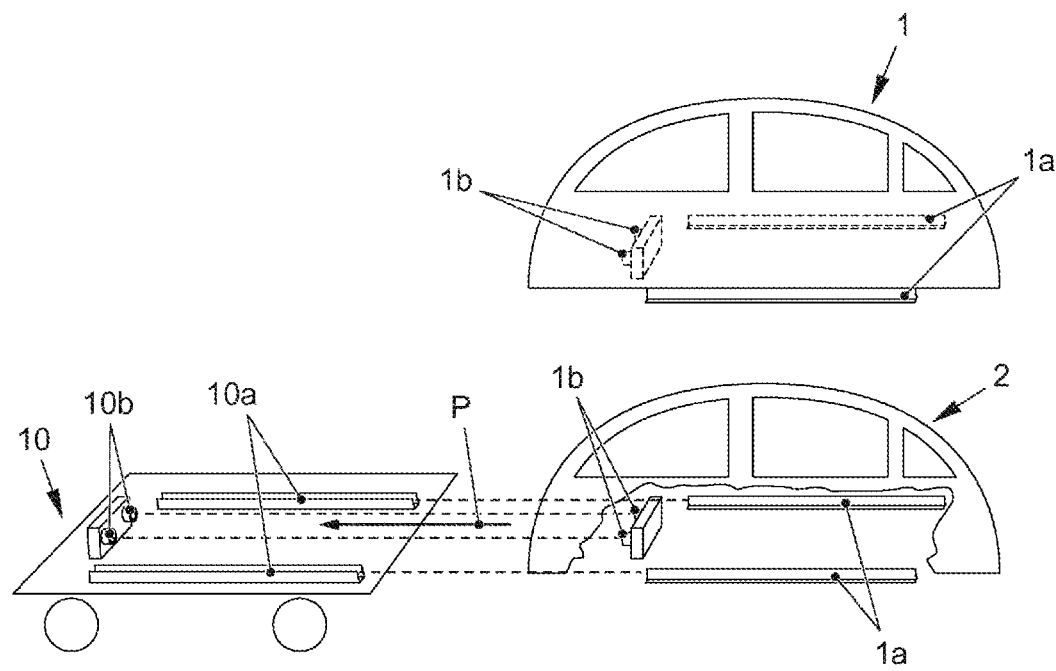
FIG. 3 shows a schematic illustration of a vehicle carrier, two CABs and their mutual interfaces according to an exemplary embodiment of the technology disclosed.

FIG. 3 shows a basic perspective diagram for temporarily connecting a vehicle carrier 10 to a first CAB 1 or to a second CAB 2. Mechanical interfaces 10a which are equipped in a manner corresponding to one another on the vehicle carrier 10 and mechanical interfaces 1a in the CABs 1, 2 ensure a rapid and crash-proof connection between the CAB 1, 2 and the vehicle carrier 10. If information and/or energy is intended to be exchanged by the CAB 1, 2 with the vehicle carrier 10 or the other way round, additional interfaces 1b, 10b corresponding to one another are arranged on the CABs 1, 2 and the vehicle carrier 10 and are likewise engaged with one another in the direction of an arrow P. Alternatively or additionally, further or alternative interfaces between the CABs 1, 2 and the vehicle carrier 10 can engaged with one another in a corresponding manner. For example, a heating/cooling power, hydraulic energy, compressed air, etc. can be exchanged between the CABs 1, 2 and the vehicle carrier 10. The interfaces can be monitored using IT, with the result that a use/journey of the mobile service vehicle is enabled only if contact is properly made with the respective interfaces and the interfaces are accordingly locked. Whereas the illustrated mechanical interfaces 10a of the vehicle carrier 1 are configured with U-shaped or rail profiles which can be engaged with T-shaped profiles illustrated by way of example as interfaces 1a of the CABs 1, 2, it goes without saying that other mechanical interfaces are possible and can possibly be engaged with one another in a direction other than that of the illustrated arrow P. However, if the CABs 1, 2 can be mounted in a jacked-up manner at a suitable height, the vehicle carrier 10 can automatically move under the CAB 2, as illustrated, in which case the interfaces 1b, 1a, 10b, 10a are engaged with one another without the need for a complicated lifting apparatus or the like. If necessary, an air suspension of the vehicle carrier 10 can be used to carry out a slight height adjustment. Whereas, within the scope of the technology disclosed in the present case, a CAB need not necessarily be understood as meaning a passenger compartment with service-specific internal equipment, this is a suitable configuration of the technology disclosed in the present case. Alternatively, in the sense of the technology disclosed in the present case, the CAB may be an only temporary part of the passenger compartment (integrally produced with the vehicle carrier 10). In this configuration, the interfaces illustrated in FIG. 3 (or other suitable interfaces) can be arranged between the CAB and the passenger compartment. The interfaces may be arranged, for example, on the roof and/or in the side panels and/or in the base of the CAB and the passenger compartment.

Figure 4:
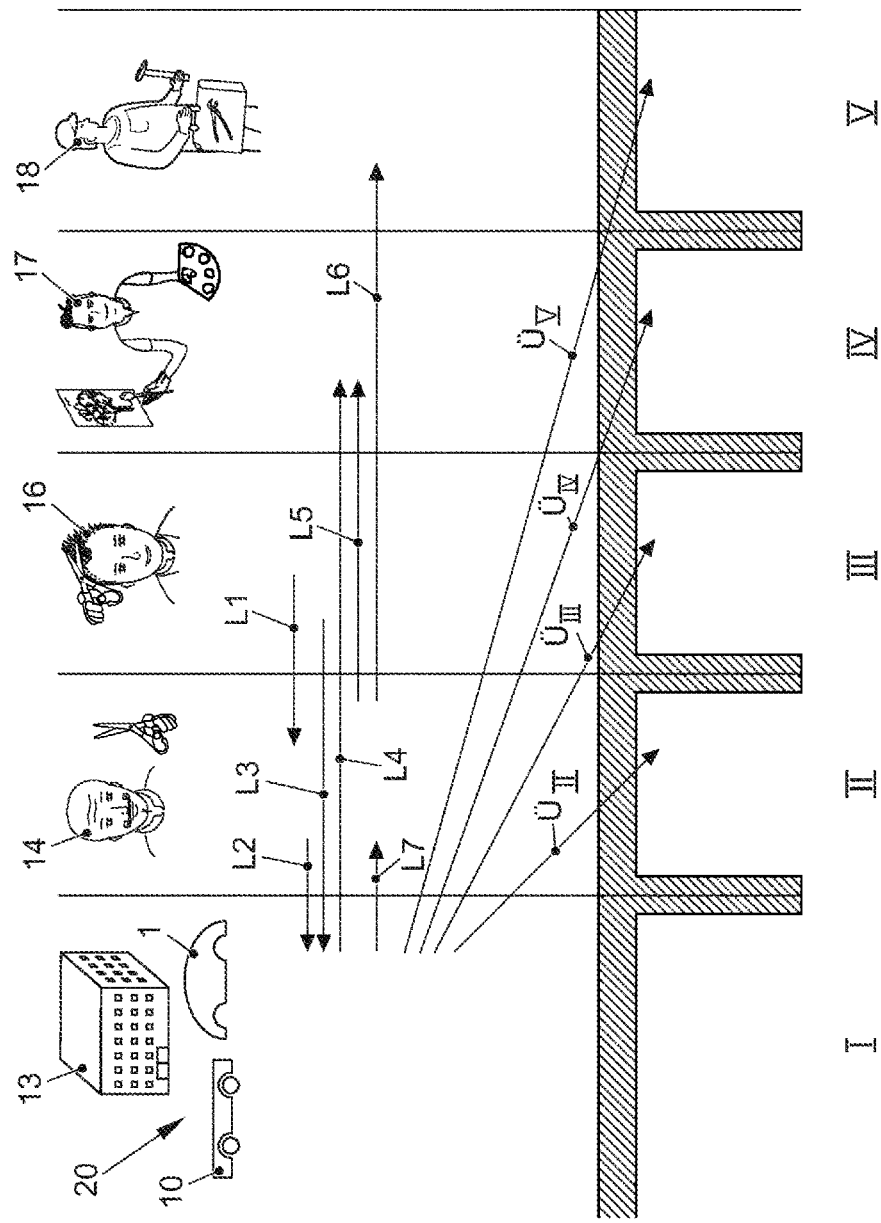
FIG. 4 shows a schematic overview of flows/movements of payment records which can be booked/assigned according to disclosed embodiments to document payments between the entities involved in the disclosed ecosystem.

FIG. 4 shows a schematic illustration of parties involved/included in the disclosed ecosystem for providing mobile services. An operator 13 (for example, transportation a vehicle manufacturer/mobility service provider) provides a vehicle carrier 10 and a CAB 1 which can be assembled to form a mobile service vehicle 20. In the mobile service vehicle 20, a hairdresser 14 as a service provider can cut the hair of a consumer 16 (customer). To expand his sales/competitive benefit over the competitors (not illustrated), the hairdresser 14 has resorted to a CAB 1 which is configured by a designer 17 and is assembled by a renowned craftsman 18. However, the designer 17 and the craftsman 18 are not immediately paid for their services. Rather, the operator or the hairdresser 14 has decided to pay both depending on success. This makes it possible to minimize the costs of market entry for the hairdresser 14. The service provided to the consumer 16 by the hairdresser 14 during the journey is represented by a payment record L1 as a first payment record which symbolizes/documents the obligation of the customer 16 to pay the hairdresser 14. The customer 16 has an obligation with respect to the operator 13 for the mobility service by virtue of a payment record L3. This payment record could also be referred to as a "transportation fee". If the hairdresser 14 is not currently dealing with a consumer 16, payment records L2 are payable to the operator of the vehicle carrier on account of the use of the vehicle carrier 10 and the CAB 1. A corresponding payment record L2 is also payable if the hairdresser 14 proportionally assumes the transportation fee for the consumer 16 to motivate the latter to use his service. For the configuration of the CAB 1, the operator 13 and/or the hairdresser 14 could be obliged to make a payment by virtue of a payment record L4 and/or L5. The craftsman 18 also makes a claim as a result of his individualization measures on the CAB 1 belonging to the hairdresser 14, which claim is illustrated by a payment record L6. Up to now, six different claims to payment records L1 to L6 have already arisen between the parties. Respective transfers would give rise to a multiplicity of inputs, confirmations, processing times during the transfer to respective bank accounts II to V of the parties and transfer fees. Moreover, a payment obligation, such as a payment record L7 between the operator 13 and the hairdresser 14, may arise if the hairdresser 14 expects a consideration on account of particularly good reviews or advertising measures for the operator 13. The simplification according to the disclosed embodiments can be effected, for example, by virtue of the fact that a payment record L3 to be transmitted from the consumer 16 to the operator 13 is received by the operator 13 and the operator 13, with knowledge of the financial agreement between the illustrated parties, carries out respective transfers ÜII to ÜV to the bank accounts II to V of the involved parties. The number of transfers ÜII to ÜV to the bank accounts II to V is reduced in this manner in comparison with the operations discussed above even when considered once. The payment records L1 to L7 can apparently be dramatically reduced with respect to the signaling effort arising therefrom, in particular, when the payments are collected by the operator 13 over a predefined period and/or over predefined transaction volumes and a respective instruction ÜII to ÜV to the bank accounts II to V is carried out only after achieving the above-mentioned boundary conditions.

Figure 5:
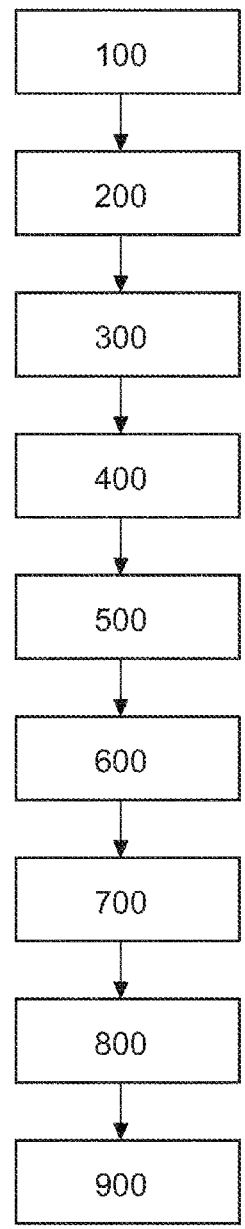
FIG. 5 shows a flowchart illustrating an exemplary embodiment of a disclosed method for recording payments for services provided in a mobile service vehicle during the journey.

FIG. 5 shows operations of an exemplary embodiment of a disclosed method for recording payments (invoicing) for services provided in a mobile service vehicle composed temporarily of a vehicle carrier and a service-specific cabin. In operation at 100, the service provider is linked to the CAB used thereby using IT. This can be carried out, for example, once a day, in connection with each service operation or only once initially until canceled. In operation at 200, a service provided by the CAB during the journey is determined. This can be carried out automatically using sensors or at least in a manner assisted by sensors. In operation at 300, a first payment record determined on the basis of the provided service is automatically assigned to an account of the service provider on the basis of the link. In other words, the service provided by the CAB is assigned to the account of the service provider on the basis of the link. In operation at 400, both the consumer and the service provider of the service provided during the journey are linked to the vehicle carrier using IT. A driving service provided by the vehicle carrier in operation at 500 can therefore be automatically assigned (at least proportionally) to a respective account of the consumer and the service provider in operation at 600. This proportional assignment can be carried out dynamically (for example, on the basis of the market situation), for example. In operation at 700, different payment records are offset with one another: the first payment record which needs to be paid to the service provider by the consumer on the basis of the service obtained, a driving payment record which must be paid to an operator of the vehicle carrier or the mobile service vehicle by the consumer and/or the service provider and a provision payment record which needs to be provided to the operator of the CAB by the service provider on the basis of the rental (for example, invoiced in a time-based manner) of the CAB. In operation at 800, a multiplicity of first payment records or payment records offset in the manner described above can be accumulated or collected to further reduce the number of transactions and to save processing time and costs. In operation at 900, a collective amount is then transmitted by the operator of the vehicle carrier to the service provider, which collective amount reflects or represents the accumulated payment records. This transmission can be carried out either to an account in a parallel currency managed by the operator or to a bank account in a conventional financial institution.

LIST OF REFERENCE SIGNS

1 First CAB
1a Mechanical interface of the CAB
1b IT/energy interface of the CAB
2 Second CAB
7 Server
8 Radio tower
10 Vehicle carrier 10a Mechanical interface of the vehicle carrier
10b Energy/IT interface of the vehicle carrier
12 User
13 Service provider
14 Microservice provider (hairdresser)
16 Consumer/customer
17 Designer
18 Craftsman
20 Mobile service vehicle
D1-D8 Services
L1-L7 Payment records
ÜII to ÜV Transfers to bank accounts
I-V Bank accounts
P Arrow
100-900 Method operations

The invention claimed is:

1. A method for reducing a number of signaling instances to a third party performed in response to recording payments for services provided by a service provider during a journey in a mobile service vehicle temporarily composed of a vehicle carrier and a service-specific cabin (CAB) that is being used by the service provider during the journey to provide services, the method comprising:

linking an identity of the service provider to an identification of the CAB using information technology to generate a CAB-specific link;
determining a service provided in the CAB during the journey; automatically assigning a first payment record corresponding to the provided service to an account of the service provider based on the CAB-specific link, the first payment record including a fee that a consumer of the provided service owes to the service provider based on the provided service; linking the identity of the service provider to the vehicle carrier using information technology to generate a vehicle carrier-specific link; determining a driving service provided by the vehicle carrier; automatically assigning at least part of a second payment record corresponding to the driving service to the account of the service provider based on the vehicle carrier-specific link, the second payment record including a fee owed to a driver of the driving service; automatically assigning an offset payment record determined based on an offset sum to the account of the service provider, the offset sum being calculated based on offsetting the fee included in the first payment record with the fee included in the second payment record and with a fee owed to an operator of the vehicle carrier on account of the provision of the CAB included in a provision payment record provided by the operator of the vehicle carrier; linking a consumer of the service provided during the journey to the vehicle carrier using Information technology; determining a driving service provided by the vehicle carrier; and automatically assigning at least part of the second payment record corresponding to the driving service to an account of the consumer based on the link, wherein the provided service by the CAB is automatically determined using sensors.

2. The method of claim 1 wherein the offset payment record is assigned to the account of the service provider by the consumer or by the operator of the vehicle carrier.

3. The method of claim 1 wherein the operator of the vehicle carrier is identical to the operator of the CAB.

4. The method of claim 1, further comprising:
accumulating a plurality of further payment records each corresponding to an additional party that is owed payment for an additional service provided in connection with the provided service; and transmitting a corresponding collective amount owed to the additional parties as indicated in the plurality of further payment records to the service provider.

5. The method of claim 1, further comprising linking the service provider and the account of the service provider to a second CAB using information technology.

6. The method of claim 1, further comprising:
determining an originator payment record provided by a manufacturer and/or originator of the CAB based on the provided service during the journey; and offsetting the originator payment record with the first payment record.

7. The method of claim 1, further comprising offsetting at least part of the first payment record with a procurement fee for an item of equipment of the CAB.

* * * * *